US009092945B2

(12) United States Patent
Walker et al.

(10) Patent No.: US 9,092,945 B2
(45) Date of Patent: *Jul. 28, 2015

(54) SYSTEMS AND METHODS FOR OPERATING LOTTERY GAMES INCLUDING PLAYER-DESIGNATED BENEFICIARIES AND CONDITIONAL PAYOUT DISTRIBUTION

(71) Applicant: Inventor Holdings, LLC, Stamford, CT (US)

(72) Inventors: Jay S. Walker, Ridgefield, CT (US); Michael W. Patterson, Mount Vernon, NY (US); Evan R. Walker, White Plains, NY (US); Matthew P. Ellenthal, Wilton, CT (US)

(73) Assignee: Inventor Holdings, LLC, Stamford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/091,003

(22) Filed: Nov. 26, 2013

(65) Prior Publication Data

US 2014/0141856 A1 May 22, 2014

Related U.S. Application Data

(63) Continuation of application No. 12/889,382, filed on Sep. 23, 2010, now Pat. No. 8,591,307.

(60) Provisional application No. 61/245,164, filed on Sep. 23, 2009.

(51) Int. Cl.
*G06F 17/00* (2006.01)
*G07F 17/32* (2006.01)

(52) U.S. Cl.
CPC .......... *G07F 17/329* (2013.01); *G07F 17/3258* (2013.01)

(58) Field of Classification Search
CPC G07F 17/3244; G07F 17/3258; G07F 17/329
USPC .......................................................... 463/17–18
See application file for complete search history.

(56) References Cited

U.S. PATENT DOCUMENTS

| | | | | |
|---|---|---|---|---|
| 5,629,980 | A * | 5/1997 | Stefik et al. | 705/54 |
| 7,111,777 | B2 * | 9/2006 | Singhal | 235/380 |

(Continued)

OTHER PUBLICATIONS

Bush, Michael, "FreeLotto's Click2Give Offers Winners Chance to Donate Winnings", Sep. 21, 2000, Direct Marking News.*

(Continued)

*Primary Examiner* — Michael Cuff
(74) *Attorney, Agent, or Firm* — Michael D. Downs; Fincham Downs, LLC

(57) ABSTRACT

Systems, apparatus, methods and articles of manufacture provide for the distribution of a payout amount associated with a lottery ticket being conditioned or otherwise based on the payout amount. Some embodiments provide for determining a positive payout amount associated with a lottery ticket and determining at least one recipient and/or beneficiary of the positive payout amount based on (i) the positive payout amount and/or (ii) a recipient or beneficiary associated with the lottery ticket and/or the payout amount. In one embodiment, larger prizes (e.g., a jackpot prize, a prize greater than a predetermined threshold payout amount) are awarded to the player(s) of a virtual lottery ticket (e.g., shared by the players), and smaller prizes are distributed to a charitable organization (e.g., other than any of the players) selected by one or more players of the lottery ticket.

9 Claims, 6 Drawing Sheets

(56) References Cited

U.S. PATENT DOCUMENTS

| | | | | |
|---|---|---|---|---|
| 7,374,483 | B2 * | 5/2008 | Wiltshire et al. | 463/17 |
| 7,520,808 | B1 * | 4/2009 | Wolf | 463/17 |
| 7,584,123 | B1 * | 9/2009 | Karonis et al. | 705/26.3 |
| 7,909,689 | B2 * | 3/2011 | Lardie | 463/16 |
| 8,249,964 | B2 * | 8/2012 | DePena | 705/35 |
| 2002/0039917 | A1 * | 4/2002 | Armstrong et al. | 463/16 |
| 2002/0082073 | A1 * | 6/2002 | Howson | 463/17 |
| 2002/0099654 | A1 * | 7/2002 | Nair | 705/40 |
| 2003/0163402 | A1 * | 8/2003 | Kincart | 705/36 |
| 2004/0034585 | A1 * | 2/2004 | Saunders | 705/35 |
| 2004/0137980 | A1 * | 7/2004 | Aenlle | 463/17 |
| 2004/0225569 | A1 * | 11/2004 | Bunnell | 705/26 |
| 2005/0026670 | A1 * | 2/2005 | Lardie | 463/16 |
| 2006/0293956 | A1 * | 12/2006 | Walker et al. | 705/14 |
| 2007/0191084 | A1 * | 8/2007 | Tarantino | 463/16 |
| 2008/0268938 | A1 | 10/2008 | Doutriaux | |
| 2009/0082081 | A1 * | 3/2009 | Walker et al. | 463/17 |
| 2009/0221342 | A1 * | 9/2009 | Katz et al. | 463/17 |
| 2009/0327122 | A1 * | 12/2009 | Isac | 705/39 |
| 2010/0049652 | A1 * | 2/2010 | Young | 705/39 |
| 2010/0203942 | A1 * | 8/2010 | Walker et al. | 463/17 |
| 2011/0009176 | A1 * | 1/2011 | Knebli | 463/17 |

OTHER PUBLICATIONS

Web pages from http://www.millionairegreetings.com, copyright 2009 Millionaire Greetings, downloaded Sep. 21, 2010, 11 pp.

Notice of Allowance for U.S. Appl. No. 12/889,382, mailed Jul. 24, 2014, 8 pp.

Final Office Action for U.S. Appl. No. 12/889,382, mailed Jan. 18, 2013, 10 pp.

Final Office Action for U.S. Appl. No. 12/889,382, mailed Oct. 2, 2012, 10 pp.

Office Action for U.S. Appl. No. 12/889,382, mailed Jan. 4, 2012, 10 pp.

* cited by examiner

SYSTEMS AND METHODS FOR OPERATING LOTTERY GAMES INCLUDING PLAYER-DESIGNATED BENEFICIARIES AND CONDITIONAL PAYOUT DISTRIBUTION

CROSS-REFERENCE TO RELATED APPLICATIONS

This application is a continuation of U.S. patent application Ser. No. 12/889,382 filed Sep. 23, 2010, entitled "SYSTEMS AND METHODS FOR OPERATING LOTTERY GAMES INCLUDING PLAYER-DESIGNATED BENEFICIARIES AND CONDITIONAL PAYOUT DISTRIBUTION", incorporated herein by reference, which claims the benefit of priority to U.S. Provisional Patent Application No. 61/245,164, filed Sep. 23, 2009, which is incorporated herein by reference.

BACKGROUND

In the United States, lotteries typically exist as a means of providing primary or supplemental funding for legislatively mandated causes, such as tuition for higher education and/or improvements to infrastructure. Unfortunately, while these causes may be generally perceived as worthwhile, those who might otherwise play the lottery may view such causes as providing no direct (or otherwise relevant) benefit.

BRIEF DESCRIPTION OF THE DRAWINGS

An understanding of embodiments described in this disclosure and many of the attendant advantages may be readily obtained by reference to the following detailed description when considered with the accompanying drawings, in which.

DETAILED DESCRIPTION

A. Introduction

Some introductory examples of one or more embodiments are described below. The embodiments described in this disclosure are not limited to any such examples. Also, it will be understood that computer readable media (and apparatus comprising such computer readable media) may be configured so as to provide for the functionality described in the examples. Within each broader example, one or more additional, alternative, and/or optional examples of some features may be referenced, and not all such features or examples may be required.

The following hypothetical scenario is an illustrative example in accordance with one or more embodiments disclosed herein. According to this example, Juan checks his calendar and notices that his old friend Tara's birthday is coming up. He decides that he wants to do something small to say "Hello" and to wish her "Happy Birthday," but he's fallen out of touch with Tara and only has her email address. Luckily, he recently saw an advertisement for virtual lottery tickets that can be played co-operatively by two players over the internet; so he decides to purchase a lottery game to play with Tara on for her birthday.

Juan goes to a website that sells the two player virtual lottery game he saw advertised and begins to browse a selection of lottery games available for selection. He eventually finds a "birthday" themed game that would be perfect to play with Tara. After selecting the game, Juan provides basic information about Tara to allow the service to send her an instance of the game, such as her name and email address. When a virtual lottery ticket is all set up (e.g. including the "birthday" theme), Juan provides credit card information and completes his purchase.

Figure 1:
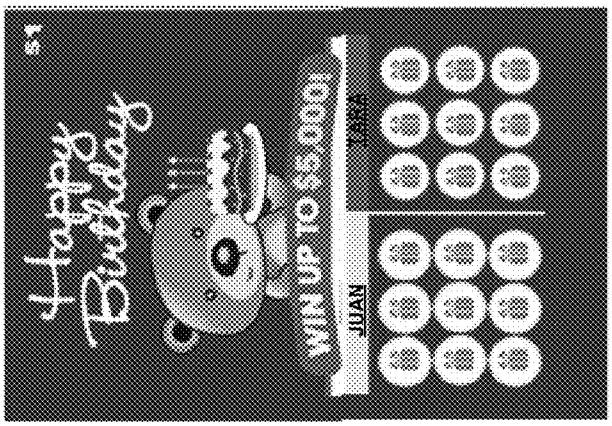
FIG. 1 is an example of a shared lottery ticket according to some embodiments of the present invention.

Since the virtual lottery ticket is a two player game, Juan is asked whether or not he will be participating in the game. Juan elects to be a player in the game, and he is prompted by the service to play his part of the game before sending it to Tara. After the purchase, Juan sees a first virtual representation of a lottery game (FIG. 1) and the following set of instructions:

> Thank you for playing Two Player Lottery. In order to see if you've won, both you and your friend will use a virtual coin to "scratch" your side of the ticket shown below. After you've revealed the icons underneath the coating, the ticket will be sent to your friend so that she can scratch her side.
>
> If one icon on your area matches one icon on the other area, you both win $5!
>
> If two icons on your area match two icons on the other area, you both win $25!
>
> If three icons on your area match three icons on the other area, you both split $5000!

Juan places his cursor over his side of the ticket, clicks, and then moves his mouse around his play area until he uncovers six icons. The website then thanks him for playing, tells him that he will receive his results via email after Tara has finished playing her side, and then asks him to click "Send" to officially send the Two Player Lottery Ticket to Tara.

Figure 2:
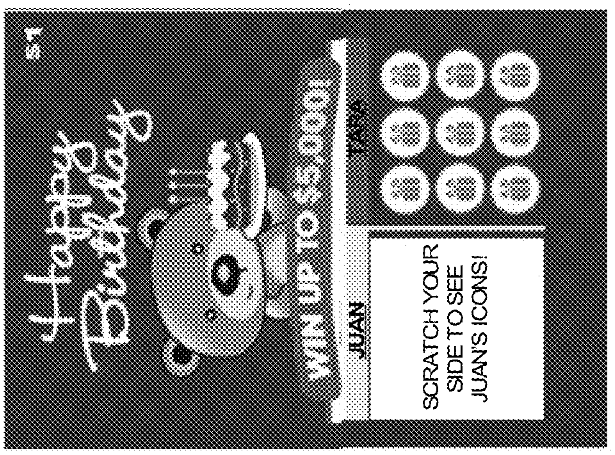
FIG. 2 is an example of a shared lottery ticket according to some embodiments of the present invention.

The next time Tara checks her email, she sees a message saying "Juan sent you a Two Player Lottery Ticket for your birthday! Click the link below to play." Tara clicks on the link and then is taken to the Two Player Lottery Website. Tara sees a virtual representation of a lottery ticket (FIG. 2) and the following set of instructions:

> Here is the Ticket that Juan bought. Juan has already played his side. In order to see if you've won, use the virtual coin to scratch your side of the ticket. After you've revealed all of the icons hidden on your side of the ticket, we'll reveal the icons that Juan has uncovered.
>
> If one icon on your area matches one icon on the other area, you both win $5!
>
> If two icons on your area match two icons on the other area, you both win $25!
>
> If three icons on your area match three icons on the other area, you both split $5000!

Figure 3:
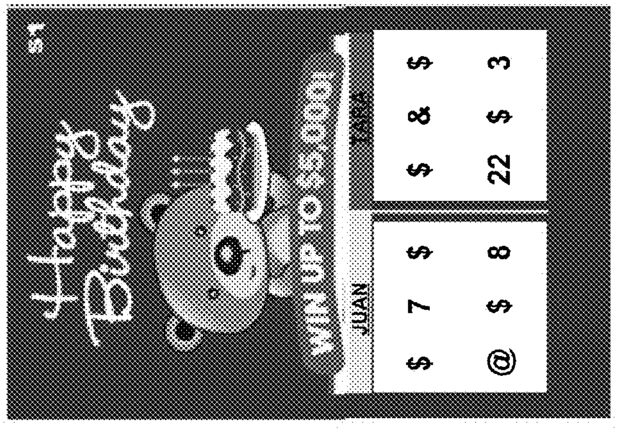
FIG. 3 is an example of a shared lottery ticket according to some embodiments of the present invention.

Tara places her cursor over her side of the ticket, clicks, and then moves her mouse around the play area until she uncovers all six icons. The website then thanks her for playing and also displays a message saying "Click Juan's side to see if you've won!" Once Juan's side of the ticket is revealed (FIG. 3), she notices that both her side of the ticket and Juan's side of the ticket have three dollar icons, which means they've won $1000 each! A message below the ticket says to check her email for results confirmation and prize redemption information. Shortly after Tara has finished playing, both Juan and Tara receive an email congratulating them on their $5000 prize and that they can claim their half of the prize at a State Lottery Prize Redemption Center by presenting a physical Price Certificate, which will be sent through the mail within the next 5 business days. Each receives an Official Prize Certificate for $2500 in the mail. Both bring their Prize Certificates to the closest State Lottery Redemption Center, and after verification, both are given checks for $2500.

Figure 4:
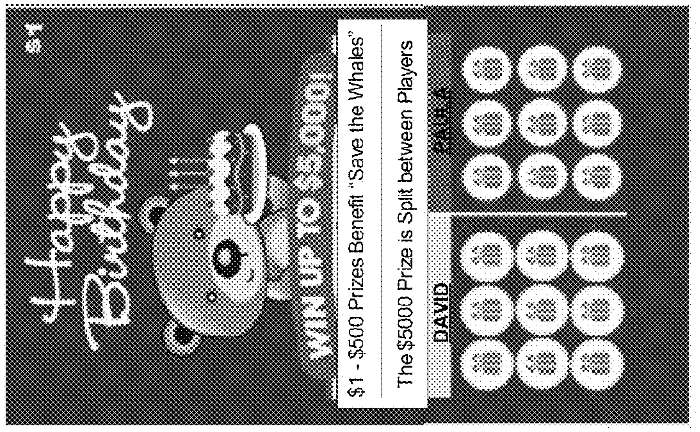
FIG. 4 is an example of a shared lottery ticket according to some embodiments of the present invention.

The following hypothetical scenario is an illustrative example in accordance with one or more embodiments disclosed herein. According to this example, David signs onto a social networking website and sees that it is his friend Paula's birthday. A lot of his friends have been sending her messages to say "Happy birthday," and fearing his message will just get lost in the mix, he decides to try out a new application he heard about recently. He browses the applications available on his social networking website and finds the one he is looking for—Charitable Tickets for Two. The application sells charitable lottery tickets that work like this: Two players play a virtual lottery ticket through the application, and there are 5 possible prizes ranging from $1-$5000. If they win any prize below the $5000 prize, the money won is automatically donated to a charity the players choose. However, if the players win the top prize, they get to split it 50-50. Knowing that Paula is always talking about how she wishes she could do something for the environment, David decides that a lottery ticket designating an organization focusing on environmental issues as a beneficiary could be a perfect gift. David registers by providing personal and payment information to Charitable Tickets For Two. He then begins to browse a selection of lottery games. He eventually finds a birthday themed game that would be perfect to play with Paula. After selecting the game, he selects Paula as the second player from a list of people he is associated with on the social networking website, allowing Charitable Tickets for Two to send her the game when it is her turn. Finally, David is asked to select the charity he would like to donate to if they win one of the smaller prizes. He selects one called "Save the Whales". Once the virtual lottery ticket is all set up, David confirms his selection and completes his purchase. Since the virtual ticket is a two player game, David is asked to play his part of the game before sending it to Paula. After the purchase, David sees a virtual representation of a lottery game (FIG. 4) and the following set of instructions:

Thank you for playing Two Player Lottery. In order to see if you've won, both you and your friend will use a virtual coin to "scratch" your side of the ticket shown below. After you've revealed the icons underneath the coating, the ticket will be sent to your friend so that she can scratch her side.

If two icons on your area match two icons on the other area, we donate $5!

If three icons on your area match three icons on the other area, we donate $10!

If four icons on your area match four icons on the other area, we donate $100!

If five icons on your area match five icons on the other area, we donate $500!

If all six icons on your area match all six icons on the other area, you both split $5000!

Figure 5:
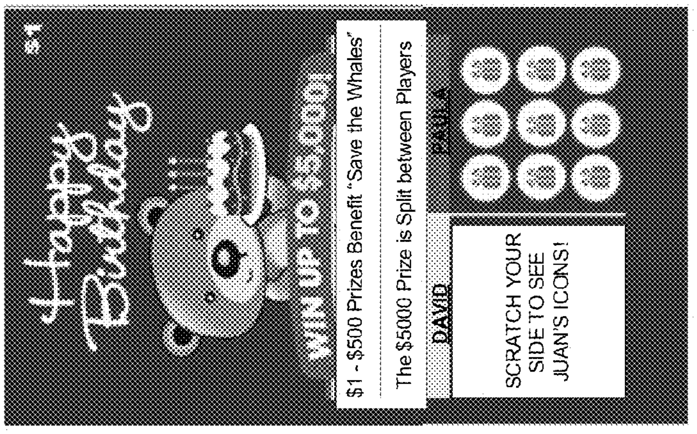
FIG. 5 is an example of a shared lottery ticket according to some embodiments of the present invention.

David places his cursor over his side of the ticket, clicks, and then moves his mouse around the play area until he uncovers 9 icons. The website then thanks him for playing, tells him that he will receive his results via email after Paula has finished playing her side, and then asks him to click "Send" to officially send the Two Player Lottery Ticket to Paula. The next time Paula logs into the social networking website, she sees a message saying "David sent you a Two Player Lottery Ticket for your birthday! Click the link below to play." Paula clicks on the link and then is taken to an area of her social networking website where she can register with Charitable Tickets for Two. Once registered, Paula sees a virtual representation of a lottery ticket (FIG. 5) and the following set of instructions:

Here is the Ticket that David bought. David has already played his side. In order to see if you've won, use the virtual coin to scratch your side of the ticket. After you've revealed all of the icons hidden on your side of the ticket, we'll reveal the icons that David has uncovered.

If two icons on your area match two icons on the other area, we donate $5!

If three icons on your area match three icons on the other area, we donate $10!

If four icons on your area match four icons on the other area, we donate $100!

If five icons on your area match five icons on the other area, we donate $500!

If all six icons on your area match all six icons on the other area, you both split $5000!

Figure 6:
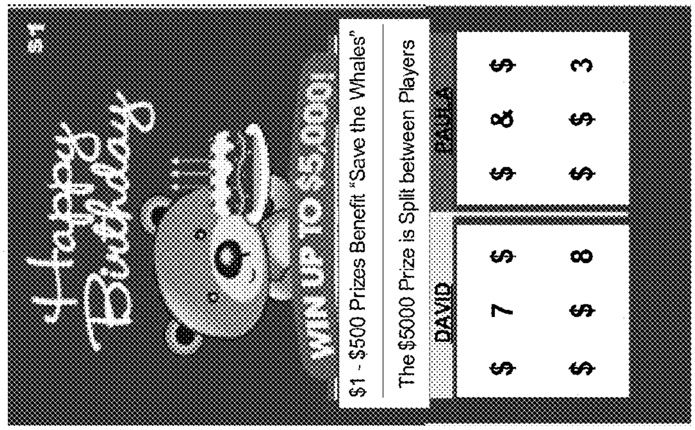
FIG. 6 is an example of a shared lottery ticket according to some embodiments of the present invention.

Paula places her cursor over her side of the ticket, clicks, and then moves her mouse around the play area until she uncovers all six icons. The website then thanks her for playing and also displays a message saying "Click David's side to see if you've won!" Once David's side of the ticket is revealed (FIG. 6), she notices that both her side of the ticket and David's side of the ticket have four dollar icons, which means they have won a $100 donation to Save the Whales! A message below the ticket says to check her email for results confirmation and prize redemption information. Shortly after Paula has finished playing, both David and Paula receive an email from Charitable Tickets for Two which says, "Save the Whales has received a $100 donation on your behalf. Your lottery ticket has made a big difference to their organization."

In accordance with exemplary and non-limiting embodiments, there are disclosed herein, among other things, systems and methods for operating lottery games, including lottery games having player-designated beneficiaries and/or conditional payout distribution.

According to some non-limiting embodiments, a virtual lottery ticket may be purchased (e.g., by a player, intermediary, ticket donor, or other purchaser) from a central controller or lottery ticket system. In one embodiment, tickets are available for purchase from an online service provider such as a web-based retailer and/or social networking service (e.g. via a software application associated with a social networking web site).

In some embodiments, the distribution of a payout amount associated with a given virtual lottery ticket may be conditioned or otherwise based on the payout amount. According to some embodiments, systems and methods are provided for determining a positive payout amount associated with a lottery ticket; and determining at least one recipient and/or beneficiary of the positive payout amount based on (i) the positive payout amount and/or (ii) a recipient or beneficiary associated previously with the lottery ticket. In one embodiment, a designation of a beneficiary is received from at least one eligible player and/or purchaser associated with the lottery ticket. Such a designation may be received, for example, during the purchase of the ticket, during activation of a lottery ticket (e.g., by a player), prior to determining the payout amount, prior to any play of the lottery ticket, or prior to revealing the payout amount (or the total payout amount) to one or more of the players. Some embodiments provide further for facilitating payment of an amount based on the payout amount to the designated recipient and/or beneficiary.

In some embodiments, systems and methods provide for determining a positive payout amount associated with a lottery ticket; and determining whether a designated beneficiary is to receive some or all of a payout amount based on whether the payout amount is less than or equal to $X, where $X is a (non-zero or positive) threshold amount associated with the lottery ticket. In one embodiment, a threshold or minimum amount may be specified or otherwise selected by a player/purchaser. In one example, a first player (who may also happen to be a purchaser of a lottery ticket) may select or otherwise identify a charitable organization to benefit from (or to receive) certain payout(s) as a result of the lottery game (e.g., should a lottery ticket be a winning lottery ticket). For instance, at the time of purchase, a player/purchaser may select a charitable organization as a designated beneficiary to receive payment of an amount based on a payout amount resulting from play of a lottery game as described herein (e.g. a multi-player lottery game facilitated via a software application associated with a social networking web site), wherein the designated beneficiary is to receive all payouts less than or equal to $600, and where $600 is specified or otherwise selected by the player/purchaser. In some cases, thresholds for distributing a payout to an entity other than purchaser and/or players (e.g. a charity) may be established prior to offering a virtual lottery ticket for sale (e.g. by a web-based retailer). At the time of purchase, a purchaser may then select a predetermined threshold payout amount to be provided to a designated beneficiary should play of the virtual lottery ticket result in a payout amount less than or equal to the threshold payout amount.

According to some embodiments, a virtual lottery ticket may be played and/or any associated payout amount shared by two or more qualified/eligible lottery players. In one embodiment, two or more players must play the virtual lottery ticket in order to allow the players to ascertain the associated game result and/or payout amount to the players.

According to some embodiments, methods and systems are provided for instant or virtual lottery games that involve the participation of multiple players (e.g., through an application on a social networking site). In one embodiment, each of the multiple players is only able to access one part (or portion) of the game, game result and/or payout amount. For example, a first player, controller, or lottery game system may invite, or otherwise facilitate access by, at least one other person to play a game in order to complete the game. In some embodiments, a second player may see the result of the first player's play. In another embodiment, the result of each player's outcome is hidden from one or more of the other participants, or participants may not see any individual game results until the game is complete. In one embodiment, after play of the game is complete, all participants may view the game's outcome; if the ticket is a winning one, the prize is revealed and the purchaser may choose how the prize(s) is/are distributed.

In another exemplary embodiment, a total payout amount associated with a virtual lottery ticket may be allocated or divided among the two or more players associated with the lottery ticket. In one example, a $10 payout amount for a winning lottery ticket may be a standalone payout that may be divided (e.g. equally) among two eligible players. Information identifying the players to whom the winnings are to be allocated may be stored, for example, in association with information identifying the lottery ticket and/or payout amount. In another exemplary embodiment, two or more partial payout amounts may be associated with the same lottery ticket. For example, a first payout of $2 and a second payout of $8 may be associated with the same lottery ticket (e.g. in respective records of a lottery ticket database). Note that $2+$8=$10 as a total payout amount for the ticket, as in the example above, but in some cases the partial amounts may be identified and/or processed separately by the controller or lottery game system.

As used herein, a "virtual lottery ticket" comprises an electronic representation of an instant or "scratch-off" lottery ticket. In some embodiments, the virtual lottery ticket may be associated with a payout amount of no or zero value (e.g. no prize or $0 for a losing lottery ticket) or of non-zero or positive value (e.g. $1, $1,000, etc. for a winning lottery ticket). In some embodiments, the payout amount may comprise merchandise, service(s) or other prize other than currency. The virtual lottery ticket may be associated with a game result (e.g. win or loss).

In another exemplary embodiment, the prize for a winning ticket in a multiplayer game must be split, and may not be collected by one player, and multiple players must redeem the ticket in order to receive the full prize amount. For instance, the full prize may be $10 and each of two individual players of the ticket is only eligible for $5. (I.e., the first payer may only collect $5 and the second player may only collect $5, and neither the first or second player alone may collect the full $10.)

As used herein, a "player" may refer to a participant in a lottery game. Such participation may be the result of a player purchasing or otherwise acquiring a lottery ticket or access to play of a lottery ticket. As discussed herein, and according to some embodiments, a player may not be a purchaser of a ticket, but may have received a lottery ticket from a purchaser who is not a player, or may have received a ticket from another player. As used herein, a "player/purchaser" may be used to refer to a purchaser who is not also a player, a player who is not a purchaser, or a player who also is a purchaser.

As used herein, a "social network" refers to a network of individuals as defined by one or more relationship(s) that may be mapped e.g. based on personal, professional or other social relationships. Examples of a social network may include: a group of friends, a group of co-workers, or a group of individuals or other associates with a common interest (e.g., photography). In a preferred embodiment, the term "social network" may refer to one of number of websites and services known in the art such as: "MySpace", "Facebook", "Friendster", "Twitter", and/or "Linked In".

As used herein, a "social network database" is a database associated with a social networking service provider. For example, a social network database may store registrant information, as well as an indication of relationships between one or more registrants. For example, Alice is a "colleague" of Bob and a "friend" of Carl. Existing social networking websites and services such as "MySpace", "Facebook", "Friendster", "LinkedIn", "Twitter" and "Orkut" may store or otherwise utilize one or more social network database(s) to facilitate interactions between their members.

As used herein, a "lottery authority" is an entity primarily responsible for the operation and oversight of various lottery hardware, software, data and/or systems as described herein.

As used herein, a "beneficiary" may comprise or include a charitable organization selected by at least one of a player and/or purchaser to benefit from (or to receive) certain payout (s) as a result of the lottery game (e.g., should a lottery ticket be a winning lottery ticket).

In addition, some embodiments are associated with a "network" or a "communication network". As used herein, the terms "network" and "communication network" may be used interchangeably and may refer to any object, entity, component, device, and/or any combination thereof that permits, facilitates, and/or otherwise contributes to or is associated with the transmission of messages, packets, signals, and/or other forms of information between and/or within one or more network devices. Networks may be or include a plurality of interconnected network devices. In some embodiments, networks may be hard-wired, wireless, virtual, neural, and/or any other configuration of type that is or becomes known. Communication networks may include, for example, one or more networks configured to operate in accordance with the Fast Ethernet LAN transmission standard 802.3-2002® published by the Institute of Electrical and Electronics Engineers (IEEE). In some embodiments, a network may include one or more wired and/or wireless networks operated in accordance with any communication standard or protocol that is or becomes known or practicable.

As used herein, the terms "information" and "data" may be used interchangeably and may refer to any data, text, voice, video, image, message, bit, packet, pulse, tone, waveform, and/or other type or configuration of signal and/or information. Information may comprise information packets transmitted, for example, in accordance with the Internet Protocol Version 6 (IPv6) standard as defined by "Internet Protocol Version 6 (IPv6) Specification" RFC 1883, published by the Internet Engineering Task Force (IETF), Network Working Group, S. Deering et al. (December 1995). Information may, according to some embodiments, be compressed, encoded, encrypted, and/or otherwise packaged or manipulated in accordance with any method that is or becomes known or practicable.

In addition, some embodiments described herein are associated with an "indication". As used herein, the term "indication" may be used to refer to any indicia and/or other information indicative of or associated with a subject, item, entity, and/or other object and/or idea. As used herein, the phrases "information indicative of" and "indicia" may be used to refer to any information that represents, describes, and/or is otherwise associated with a related entity, subject, or object. Indicia of information may include, for example, a code, a reference, a link, a signal, an identifier, and/or any combination thereof and/or any other informative representation associated with the information. In some embodiments, indicia of information (or indicative of the information) may be or include the information itself and/or any portion or component of the information. In some embodiments, an indication may include a request, a solicitation, a broadcast, and/or any other form of information gathering and/or dissemination.

According to some embodiments, shared tickets, or tickets for play by multiple people, may be purchased and played in any situation where digital information can be passed between two people, such as but not limited to:

- Shared Lottery games can be sent between mobile devices on a cellular network.
- Shared lottery games can be sent between to electronic devices connected to a telephone network, such as a PTSN
- Shared lottery games can be sent between email accounts over a computer network connecting one computing device to another computing device
- Shared lottery games can be passed between two electronic devices connected to a satellite network
- Shared lottery games can be passed between two electronic devices connected to a cable network According to some exemplary and non-limiting embodiments, information associated with one or more lottery tickets (including, for example, indications of payout amount(s), result(s), designated charities or other beneficiaries, associated players or purchasers), may be transmitted to, received by and stored by a player device (e.g., a computer, a cell phone, etc). In some embodiments, the information may be output by a lottery retailer terminal or other redemption device. For example, a lottery agent may receive a voucher corresponding to a lottery ticket from a player and insert associated information into a lottery retailer terminal to determine whether the ticket has won and/or the corresponding payout amount(s) (i.e. "validate" a given entry and/or ticket).

Figure 7:
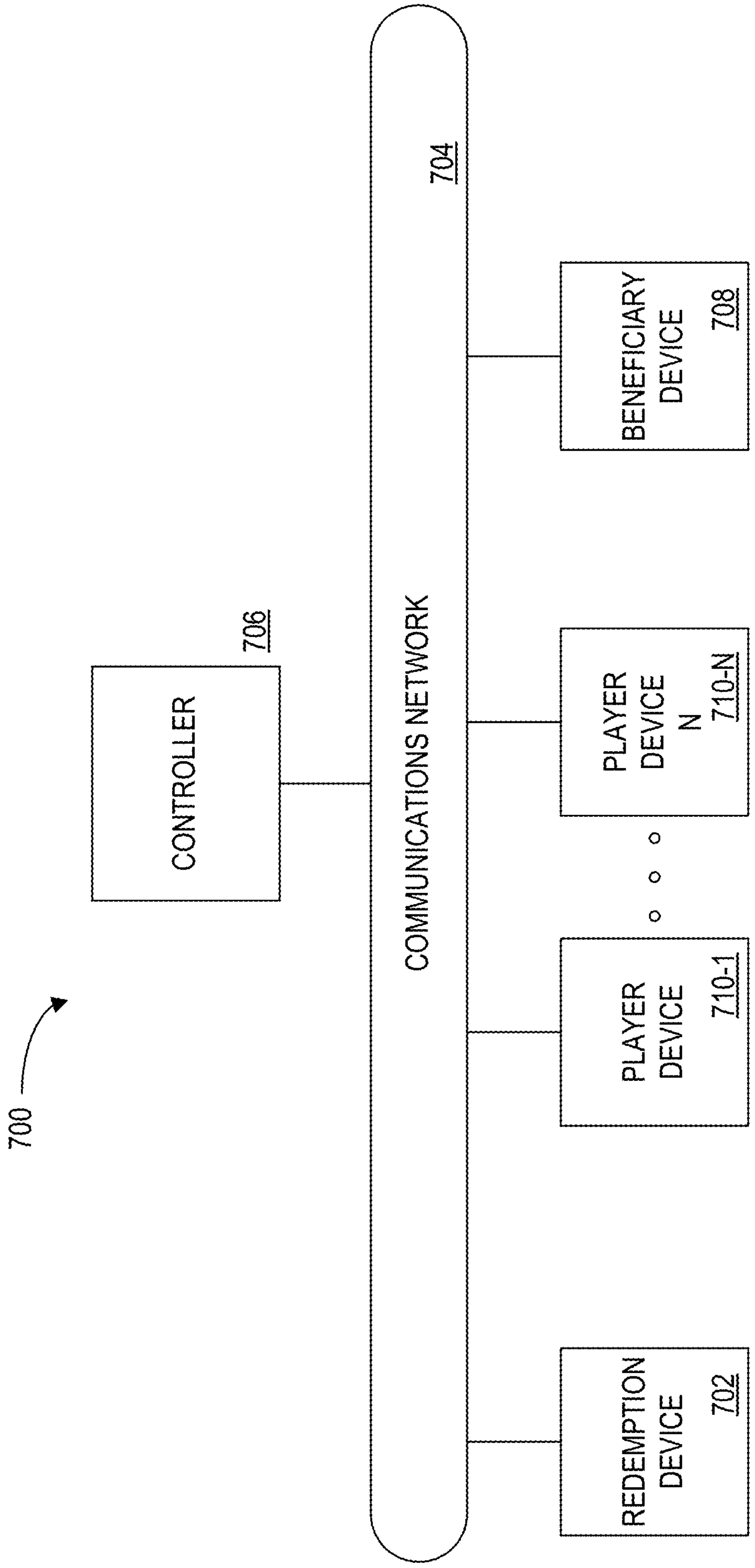
FIG. 7 is a diagram of a system according to some embodiments of the present invention.

With reference to FIG. 7, there is illustrated a network environment system 700 for practicing exemplary and non-limiting embodiments disclosed herein. System 700 may comprise at least one redemption device 702, a communications network 704, at least one beneficiary device 708, a plurality of player devices 710, and a controller 706. Generally, any or all of the redemption devices 702 may comprise a lottery retailer or lottery retailer terminal and may operate to: (i) receive information associated with one or more lottery tickets including such data as: (a) ticket and/or lottery entry identifier(s), (b) one or more player identifiers; (ii) transmit any or all of the received information to the controller 706 via the communications network 704; and (iii) output information including such data as: (c) information associated with one or more payout amounts, prize awards or benefits. An example redemption device 702 available in the marketplace is the EXTREMA® clerk-operated lottery terminal, distributed by Scientific Games Corporation of Alpharetta, Ga.

The controller 706 may operate to: (i) receive and store information associated with one or more lottery tickets including such data as: (a) ticket and/or lottery entry identifier (s), (b) player identifiers, (c) beneficiary identifiers, (d) threshold payout amounts, and (e) payout amounts; (ii) determine beneficiaries associated with lottery tickets; (iii) determine payout amounts to be allocated among one or more players and/or beneficiaries of a lottery ticket; and (iv) facilitate the providing of some or all portions of a payout amount to the appropriate player(s) and/or beneficiaries.

Generally, as explained above, the communications network 704 may comprise or include one or more local and/or wide-area network(s), proprietary and/or public network(s) (e.g., the Internet) for facilitating two-way data communications between the redemption devices 702, the player devices 710-1 to 710-N, the beneficiary devices 708 and the controller 706. The controller 706 may communicate with other devices directly or indirectly, via a wired or wireless medium such as the Internet, via a local area network (LAN), via a wide area network (WAN), via an Ethernet, via a Token Ring, a telephone line, a cable line, a radio channel, an optical communications line, a satellite communications link, or via any appropriate communications means or combination of communications means. Any number and type of devices, including redemption devices 702, beneficiary devices 708 and player devices 710, may be in communication with the controller 706, and communication between the devices and the controller 706 may be direct or indirect, such as over the Internet through a Web site maintained by computer on a remote server, or over an online data network including commercial online service providers, bulletin board systems and the like. In some embodiments, the devices may communicate with one another and/or the controller 706 over RF, cable TV, satellite links and the like. A variety of communications protocols may be part of any such communications system, including but not limited to: Ethernet (or IEEE 802.3), SAP, ATP, Bluetooth, and TCP/IP.

In accordance with the disclosed exemplary embodiments, devices in communication with each other need not be continually transmitting to each other. On the contrary, such devices need only transmit to each other as necessary, and may actually refrain from exchanging data most of the time. For example, a device in communication with another device via the Internet may not transmit data to the other device for days or weeks at a time. In some embodiments, a server computer may not be necessary and/or preferred. For example, in one or more embodiments, methods described herein may be practiced on a stand-alone player device 710 and/or a player device 710 in communication only with one or more other player devices 710. In such an embodiment, any functions described as performed by the computer or data described as stored on the computer may instead be performed by or stored on one or more player devices 710.

Figure 8:
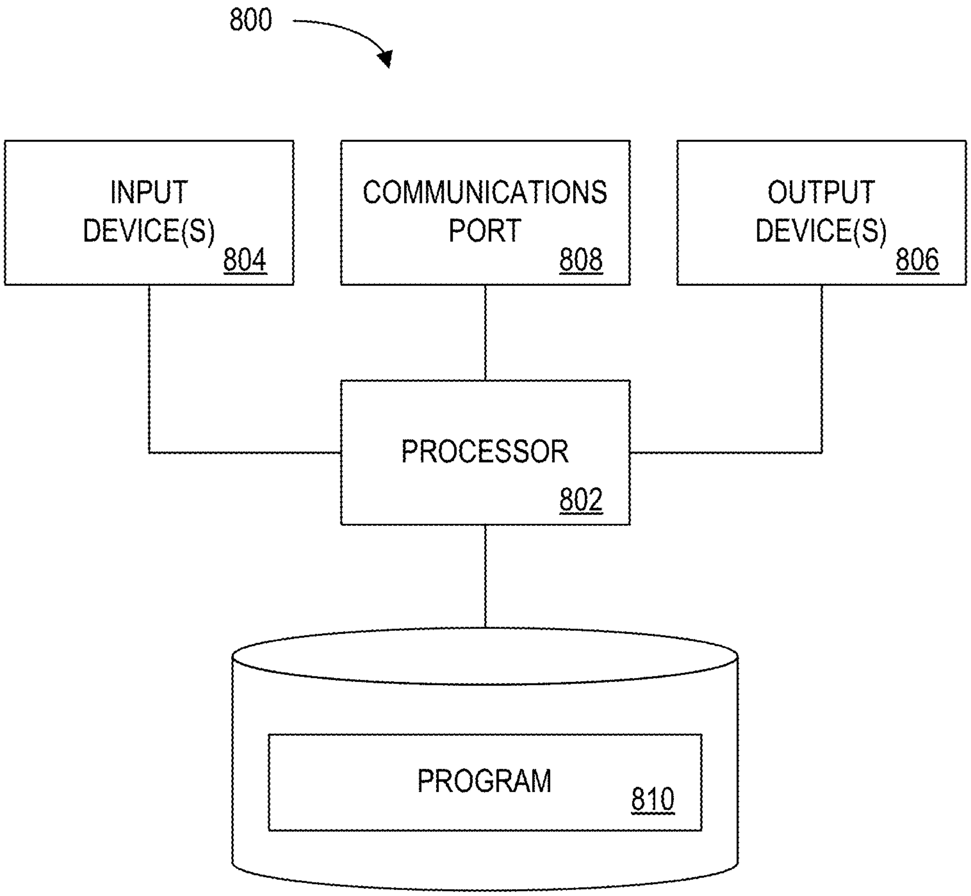
FIG. 8 is a diagram of a computer system according to some embodiments of the present invention.

With reference to FIG. 8, there is illustrated a block diagram of an exemplary and non-limiting embodiment of a computing device 800 such as a redemption device 702, player device 710 or beneficiary device 708. The computing device 800 may include one or more processor(s) 802 such as the PENTIUM® processor, manufactured by INTEL Corporation, or other processors manufactured by other companies, such as the AMD Athlon® processor manufactured by the Advance Micro Devices company. Generally, the processor 802 is operative to perform or process instructions, and in particular, to operate in accordance with the various methods described herein. For example, the processor 802 may be operable to allow the computing device 800 to transmit data to (and receive data from) the controller 706 of FIG. 7.

Accordingly, the computing device 800 may further include one or more input device(s) 804. The input devices 804 may include components such as an optical scanner and/or a barcode scanner, for reading and/or for deriving information associated with a lottery entry. For example, a lottery ticket or voucher may include registration marks, authenticity data, various codes, micro-printed indicia, one or more sense marks, and/or other lottery indicia that must be read, for example, to distinguish between one or more lottery entries (which may all be contained on one lottery ticket, for example). Examples of additional input devices include, but are not limited to, a keypad, a mouse, an image capturing device (e.g., an optical character recognition (OCR) device), a biometric reader, a portable storage device (e.g., a memory stick), and the like.

The computing device 800 may further include one or more output device(s) 806. Such output device(s) 806 may include such components as a display for outputting information to a player, a beneficiary, or to a terminal operator (e.g., win/loss information and/or payout amounts), one or more benefit output devices (e.g., a cash drawer, a currency dispenser), a printer for producing a physical record (e.g., paper slip, receipt, ticket, voucher, coupon, etc.) that defines a lottery ticket, lottery ticket redemption voucher or lottery entry, audio/video output device(s), and the like.

The computing device 800 may also include one or more communications port(s) 808, such as a serial port, modem or the like. Generally, the communications port 808 may be operable to facilitate two-way data communications between (i) the redemption device 702, player device 710, and/or beneficiary device 708 and (ii) the controller 706. In accordance with some embodiments, the communications port 808 may operate to facilitate the transmission of information between, for example, a redemption device 702 and one or more player devices 710 such as a personal digital assistant (PDA), cell phone and/or a dedicated (e.g., a proprietary) device.

The computing device 800 may further include a data storage device 810 such as a hard disk, optical or magnetic media, random access memory (RAM) and/or read-only memory (ROM), or the like memory device. Generally, the data storage device 810 stores a software program, the software program 812 enabling the processor 802 of the computing device 800 to perform various functions including some or all of the various steps described herein.

Figure 9:
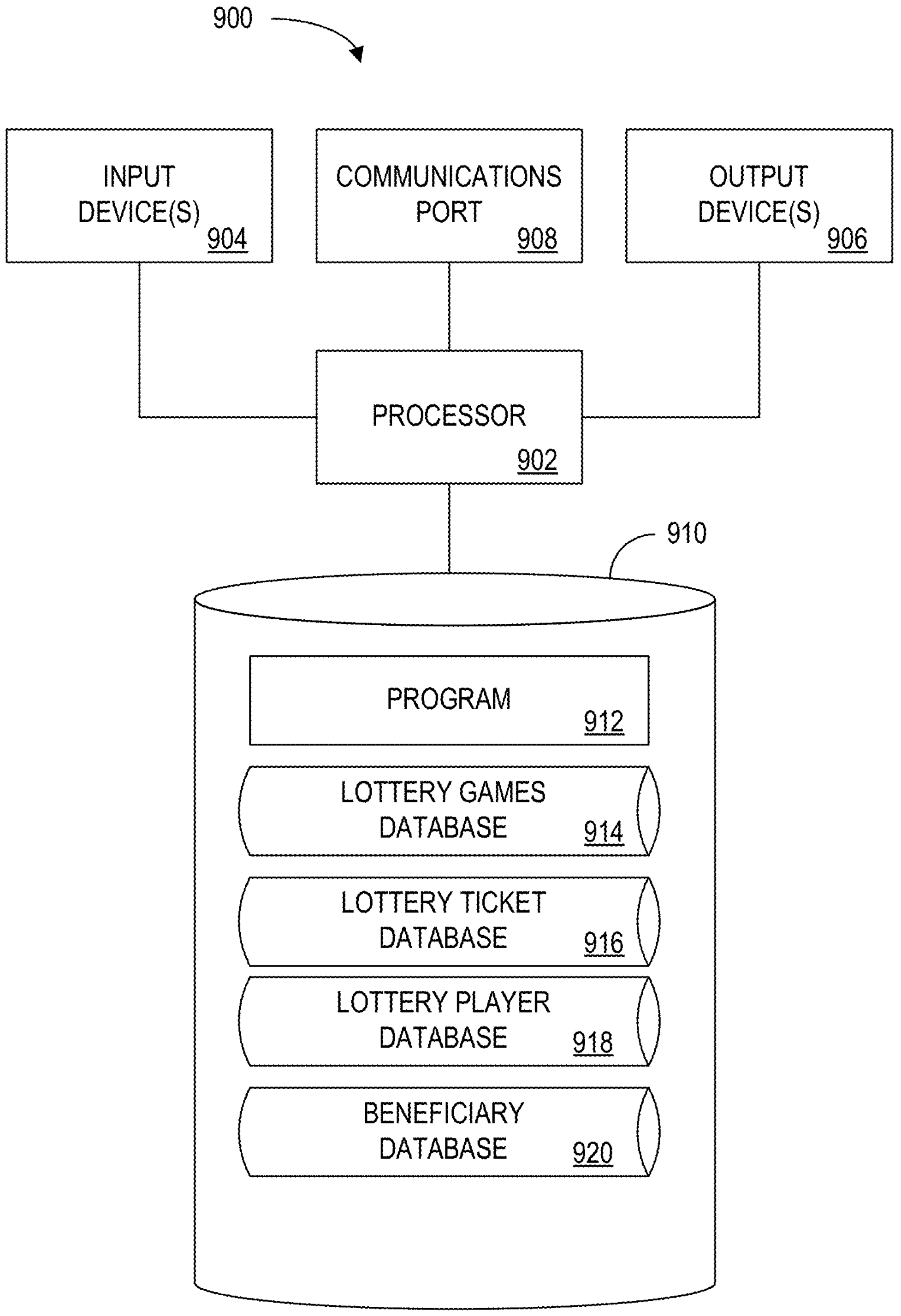
FIG. 9 is a diagram of a computer system according to some embodiments of the present invention.

With reference to FIG. 9, there is illustrated an exemplary and non-limiting embodiment 900 of a controller 706 or ticket management system according to the disclosure. Similar to the computing device 800, the controller 706 may include one or more processor(s) 902 such as the PENTIUM® processor manufactured by INTEL Corporation, or the AMD Athlon® processor manufactured by the Advance Micro Devices company. Such a processor 902 functions to process instructions, and in particular, to operate in accordance with various methods described herein. For example, the processor 902 may operate to allow the controller 706 to transmit data to (and receive data from) the devices shown in FIG. 7. More specifically, the controller processor 902 may enable the transmission of data defining or identifying a virtual lottery ticket and/or players, data associated with a lottery ticket such as message, an e-card greeting, any media uploaded or attached to the ticket by the player, as well as information defining one or more payout(s) associated with that lottery ticket, to one or more lottery players, a lottery authority, a beneficiary or beneficiary device, or to a specific one of the redemption devices 702. Thus, the controller may be implemented as a system controller, a dedicated hardware circuit, an appropriately programmed general-purpose computer, or any other equivalent electronic, mechanical or electro-mechanical device. In various embodiments, a controller may comprise, for example, a personal computer (e.g., which communicates with a remote lottery sales terminal) or mainframe computer.

The controller 706 may further include one or more input device(s) 904. Examples of such input devices include a keypad, a mouse, a touch-screen, a random number generator, a microphone, and other digital or analog input devices. According to some embodiments, the controller input device (s) 904 may comprise or include a clock.

Exemplary embodiments of the controller 706 further include one or more output device(s) 906. Example of output device(s) 906 include a monitor or other display for outputting information to a user of the controller 706 (e.g., for displaying information such as statistical or sales data, win and loss information, team and/or associated ticket information, and/or payout amounts), a printer for producing a physical record (e.g., a report, a paper slip, a voucher, a coupon, a ticket) of such data, and the like. In addition, the controller 706 may include one or more communications ports 908, such as a serial port, modem or the like, operable to facilitate two-way data communications between the exemplary devices depicted in FIG. 7.

The controller 706 may also include a data storage device 910 (e.g., a hard disk or hard drive, a media-based (removable) memory, or the like). In some embodiments, the controller data storage device 910 stores at least one software program 912, which includes a program to enable the processor 902 to perform some or all of the various steps and functions of at least one implementation of the methods described in detail herein. In addition, the controller data storage device 910 may operate to store (i) a lottery games database 914, (ii) a lottery ticket database 916, (iii) a lottery player database 918, and (iv) a beneficiary database 920.

In some embodiments, the controller 706 may include or be in communication with a lottery ticket server device (e.g., maintained by a lottery services vendor on behalf of a lottery authority) and may receive information about lottery tickets or lottery entries from the lottery ticket service device.

In accordance with exemplary and non-limiting embodiments, a kiosk (not shown) may be configured to execute or assist in the execution of various lottery game processes. In an exemplary embodiment, a kiosk may comprise a processor and a storage device or memory as described above. A kiosk may also comprise various input devices (e.g., a keyboard, a mouse, buttons, an optical scanner for reading barcodes or other indicia, a CCD camera, and the like), output devices (e.g., a display screen, audio speakers, printer), benefit output devices (e.g., a coin tray, a currency dispenser), communications ports, and the like. A kiosk may be configured to communicate with a lottery controller or lottery server. In some embodiments, kiosks may execute or assist in the execution of various lottery functions, as described herein.

The lottery games database 914 stores data associated with one or more lottery games and/or lottery game formats. It should be understood that the various database examples described herein include illustrative accompanying data as shown in the drawings. Each record in the lottery games database 914 generally defines a game available for play and/or for purchase of lottery entries by a lottery player. In particular, for each game defined by an entry in the lottery games database, a game identifier field stores data that uniquely identifies the lottery game of the corresponding record. The data stored in the game identifier field may comprise, for each available game, a unique numeric, alphanumeric or other type of code that uniquely identifies the lottery game defined by the corresponding entry.

The lottery ticket database 916 stores data associated with lottery tickets. In accordance with exemplary embodiments, the lottery ticket database 916 may include information, such as lottery ticket identifiers (e.g., "14958085123"), one or more players associated with a lottery ticket, and one or more payout or partial payout amounts associated with lottery tickets. For example, a player may be required to pay an additional fee when purchasing a ticket in order to qualify for team play or a player may be required to register with a lottery website and receive a player identifier in order to qualify for team play.

In accordance with some exemplary embodiments, the lottery player database 918 may include information, such as player identifiers, ticket identifiers, and/or player name(s). In some exemplary and non-limiting embodiments, the beneficiary database 920 may include information, such as identifiers that uniquely identify beneficiaries (e.g., designated to receive some or all of a payout amount for a winning ticket).

Figure 10:
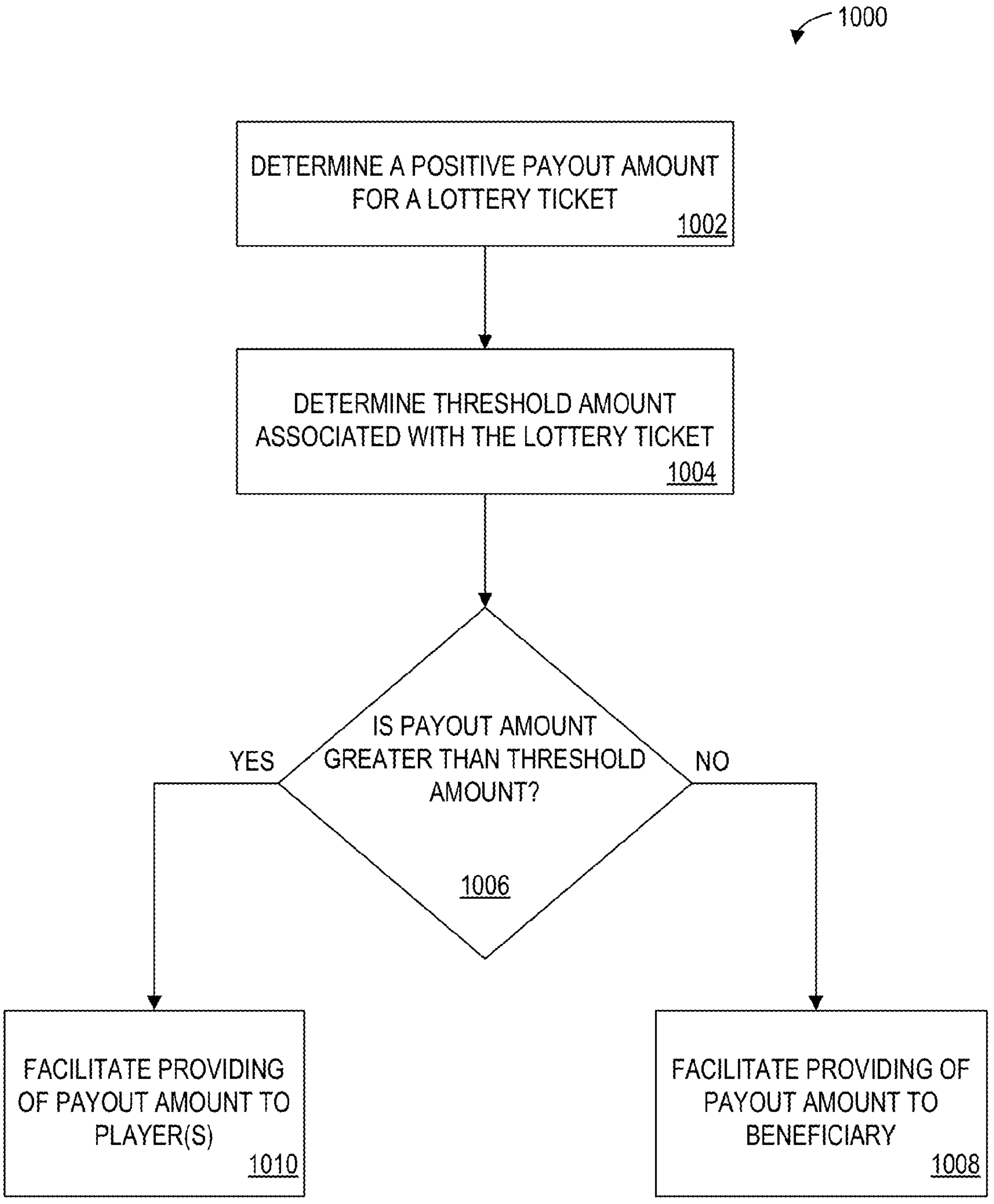
FIG. 10 is a flowchart of a method according to some embodiments of the present invention.

Referring now to FIG. 10, a flow diagram of a method 1000 according to some embodiments is shown. The method 1000 may, for example, be performed by or on behalf of a lottery authority, web service provider and/or third party administrator of a virtual lottery ticket application. For purposes of brevity, the method 1000 will be described herein as being performed by a controller 706 (e.g., a central server) operated by or on behalf of a lottery game provider. It should be noted that although some of the steps of method 1000 may be described herein as being performed by a central controller while other steps are described herein as being performed by a lottery authority, player device or charity clearinghouse, any and all of the steps may be performed by a single computing device. Further any steps described herein as being performed by a particular computing device may be performed by a human or another computing device as appropriate.

An exemplary method in accordance with one or more embodiments and that may be performed by, e.g., controller 706, is depicted in FIG. 10. At step 1002, the controller 706 determines a positive payout amount associated with a lottery ticket. At step 1004, a threshold amount associated with the lottery ticket is determined. As discussed herein, the threshold amount may be established by a player or purchaser, by the controller 706, or by a lottery authority associated with the virtual lottery ticket. The threshold amount may be stored, for example, in association with an identifier that uniquely identifies the lottery ticket, or in association with all lottery tickets for a particular lottery game. At step 1006, the controller determines whether the payout amount for the lottery ticket is greater than the threshold amount. If so, in step 1010, the controller 706 facilitates the providing of the payout amount to one or more players associated with the lottery ticket (e.g., by informing the player(s) to redeem the lottery ticket at a lottery retailer or redemption center and/or by informing a lottery authority the player(s) are eligible to receive a payout). In some embodiments, controller 706 may transmit (electronically or physically) a file, image, voucher, ticket, message, or any other virtual or physical medium that contains ticket identifiers and or outcome information that can be used to collect a prize from a physical retailer or redemption center. In other embodiments, a player may be paid directly by controller 706 through a payment made to a player owned financial account, such as a bank account, a credit card account, etc.

If the payout amount for the lottery ticket is not greater than the threshold amount, in step 1008, the controller 706 facilitates providing of at least a portion of the payout amount to one or more beneficiaries (other than the player(s)). For example, as described in one of the examples above, if a prize is less than $5000, the payout amount may be provided to a charitable organization. In one example, the controller 706 may authorize or verify that payment is to be made (e.g., from a lottery authority) to the beneficiary.

In some embodiments, the distribution of a payout amount associated with a given virtual lottery ticket may be conditioned or otherwise based on the payout amount. According to some embodiments, systems and methods are provided for determining a positive payout amount associated with a lottery ticket; and determining at least one recipient or beneficiary of the positive payout amount based on (i) the positive payout amount and/or (ii) a recipient or beneficiary associated previously with the lottery ticket. In one embodiment, a designation of a beneficiary is received from at least one eligible player and/or purchaser associated with the lottery ticket. Such a designation may be received, for example, during the purchase of the ticket, during activation of a lottery ticket (e.g., by a player), prior to determining the payout amount, prior to any play of the lottery ticket, or prior to revealing the payout amount (or the total payout amount) to one or more of the players. Some embodiments provide further for facilitating payment of an amount based on the payout amount to the designated recipient or beneficiary.

B. Example System

According to one example system, a lottery game system is integrated via an example application, called Ticket for Two, with a social networking service, web site or platform. The application includes offers a new type of virtual gift by combining greeting cards with scratch lottery tickets and also adds a charitable aspect, providing an interactive lottery scratch game with an e-card that helps raise money for charities. Each e-card includes a scratch game in which both the sender and the recipient participate. Before sending the gift, the sender may scratch his side of the game, and if specific revealed icons match those on the side that the recipient scratches, then both may be eligible to share a prize (e.g., a $5,000 cash prize). However, unlike a traditional scratch game, in some embodiments all small prizes (e.g., under $600) are donated to charity. In some embodiments, the sender and/or the recipient browses a list of available charities and selects one. In one embodiment, the selection is made upon winning a small prize, and the recipient then donates the amount won. In another embodiment, the selection may be made by the sender and/or the recipient prior to the game prize being revealed (to one or more of the players).

In one embodiment, the application may be co-branded with one or more state lottery authorities.

In some embodiments, the system includes at least one lottery vendor. A "lottery vendor" is an entity licensed by a state or other jurisdictional lottery authority to design, administer and/or distribute a game of chance. The lottery vendor creates a run of virtual scratch games based on predetermined odds, which is comprised of at least a set of game IDs and an outcome associated with each game ID. The lottery vendor then delivers the game IDs to Ticket for Two but preferably maintains a database of the games' outcomes, which are distributed to Ticket for Two as each game gets played.

In some embodiments, the system includes at least one clarity clearinghouse. A "clarity clearinghouse" is a company that acts as an intermediary between consumers on the Ticket for Two application and a charity to which the consumers would like to donate. When a player wins a small prize, he may select one or more charities associated with the charity clearinghouse. The winnings are sent from the administrator of the Ticket for Two application to the charity of his choice.

In some embodiments, the system includes a service vendor providing age verification services. For example, the service may determine if a user is eighteen years or older, or otherwise meets any age requirement of the jurisdiction(s) for which the lottery game is authorized.

In some embodiments, the system includes a service vendor providing location verification services. For example, if a ticket may be purchased only by a person within the boundaries of a state offering the lottery game, the service may determine that the user is in fact within that state at the time of the purchase of the gift.

C. Additional Examples

Some additional examples of one or more embodiments are described below. The embodiments described in this disclosure are not limited to any such examples. Also, it will be understood that computer readable media (and apparatus comprising such computer readable media) may be configured so as to provide for the functionality described in the examples. Within each broader example, one or more additional, alternative, and/or optional examples of some features may be referenced, and not all such features or examples may be required. For instance, several examples of "determining a beneficiary" are provided in the example method immediately below, but it is contemplated that one, none, or all of the stated examples of such "determining a beneficiary" may be desirable or necessary for a particular embodiment.

A system, apparatus, computer readable medium or method providing for one or more of the following functions:

- receiving an indication of a threshold payout amount associated with a virtual lottery ticket:
  - wherein receiving the indication of the threshold payout amount comprises receiving the indication prior to determining a payout amount for the virtual lottery ticket
  - wherein receiving the indication of the threshold payout amount comprises receiving the indication prior to revealing a payout amount for the virtual lottery ticket to any player of the ticket
  - wherein receiving the indication of the threshold payout amount comprises receiving the indication from a player/purchaser of the virtual lottery ticket
  - wherein receiving the indication of the threshold payout amount comprises receiving the indication from a lottery authority
- determining a payout amount for the virtual lottery ticket
- determining a beneficiary of at least a portion of the payout amount based on the payout amount
  - wherein determining the beneficiary comprises determining the beneficiary based on one or more of (i) the payout amount and (ii) a beneficiary associated previously with the lottery ticket
  - wherein determining the beneficiary comprises receiving (e.g., from a player, from a central controller, from a lottery authority) an indication of a beneficiary associated with the virtual lottery ticket
  - wherein the beneficiary is not a player of the virtual lottery ticket
- facilitating the providing of at least a portion of the payout amount to the beneficiary.

A system, apparatus, computer readable medium or method for facilitating play of a lottery game, providing for one or more of the following functions:

- determining a threshold payout amount associated with a virtual lottery ticket
- determining at least one beneficiary associated with the virtual lottery ticket
- determining a first player associated with the virtual lottery ticket
- determining a second player associated with the virtual lottery ticket
- wherein play of the virtual lottery ticket by both the first player and the second player is required
- facilitating play of the virtual lottery ticket by the first player
- facilitating play of the virtual lottery ticket by the second player
- determining a payout amount for the virtual lottery ticket
- performing one of:
  - (1) determining that the payout amount of the virtual lottery is not greater than a threshold amount and facilitating providing of the payout amount to the at least one beneficiary associated with the virtual lottery ticket
  - (2) determining that the payout amount of virtual lottery is greater than the threshold amount and facilitating allocating of the payout amount between the first player and the second player.

Interpretation

Numerous embodiments are described in this disclosure, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

The present disclosure is neither a literal description of all embodiments nor a listing of features of the invention that must be present in all embodiments.

Neither the Title (set forth at the beginning of the first page of this disclosure) nor the Abstract (set forth at the end of this disclosure) is to be taken as limiting in any way as the scope of the disclosed invention(s).

The term "product" means any machine, manufacture and/or composition of matter as contemplated by 35 U.S.C. §101, unless expressly specified otherwise.

The terms "an embodiment", "embodiment", "embodiments", "the embodiment", "the embodiments", "one or more embodiments", "some embodiments", "one embodiment" and the like mean "one or more (but not all) disclosed embodiments", unless expressly specified otherwise.

The terms "the invention" and "the present invention" and the like mean "one or more embodiments of the present invention."

A reference to "another embodiment" in describing an embodiment does not imply that the referenced embodiment is mutually exclusive with another embodiment (e.g., an embodiment described before the referenced embodiment), unless expressly specified otherwise.

The terms "including", "comprising" and variations thereof mean "including but not limited to", unless expressly specified otherwise.

The terms "a", "an" and "the" mean "one or more", unless expressly specified otherwise.

The term "plurality" means "two or more", unless expressly specified otherwise.

The term "herein" means "in the present disclosure, including anything which may be incorporated by reference", unless expressly specified otherwise.

The phrase "at least one of", when such phrase modifies a plurality of things (such as an enumerated list of things) means any combination of one or more of those things, unless expressly specified otherwise. For example, the phrase at least one of a widget, a car and a wheel means either (i) a widget, (ii) a car, (iii) a wheel, (iv) a widget and a car, (v) a widget and a wheel, (vi) a car and a wheel, or (vii) a widget, a car and a wheel.

The phrase "based on" does not mean "based only on", unless expressly specified otherwise. In other words, the phrase "based on" describes both "based only on" and "based at least on".

Where a limitation of a first claim would cover one of a feature as well as more than one of a feature (e.g., a limitation such as "at least one widget" covers one widget as well as more than one widget), and where in a second claim that depends on the first claim, the second claim uses a definite article "the" to refer to the limitation (e.g., "the widget"), this does not imply that the first claim covers only one of the feature, and this does not imply that the second claim covers only one of the feature (e.g., "the widget" can cover both one widget and more than one widget).

Each process (whether called a method, algorithm or otherwise) inherently includes one or more steps, and therefore all references to a "step" or "steps" of a process have an inherent antecedent basis in the mere recitation of the term 'process' or a like term. Accordingly, any reference in a claim to a 'step' or 'steps' of a process has sufficient antecedent basis.

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

When a single device or article is described herein, more than one device or article (whether or not they cooperate) may alternatively be used in place of the single device or article that is described. Accordingly, the functionality that is described as being possessed by a device may alternatively be possessed by more than one device or article (whether or not they cooperate).

Similarly, where more than one device or article is described herein (whether or not they cooperate), a single device or article may alternatively be used in place of the more than one device or article that is described. For example, a plurality of computer-based devices may be substituted with a single computer-based device. Accordingly, the various functionality that is described as being possessed by more than one device or article may alternatively be possessed by a single device or article.

The functionality and/or the features of a single device that is described may be alternatively embodied by one or more other devices that are described but are not explicitly described as having such functionality and/or features. Thus, other embodiments need not include the described device itself, but rather can include the one or more other devices which would, in those other embodiments, have such functionality/features.

Devices that are in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

A description of an embodiment with several components or features does not imply that all or even any of such components and/or features are required. On the contrary, a variety of optional components are described to illustrate the wide variety of possible embodiments of the present invention(s). Unless otherwise specified explicitly, no component and/or feature is essential or required.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

Although a process may be described as including a plurality of steps, that does not indicate that all or even any of the steps are essential or required. Various other embodiments within the scope of the described invention(s) include other processes that omit some or all of the described steps. Unless otherwise specified explicitly, no step is essential or required.

Although a product may be described as including a plurality of components, aspects, qualities, characteristics and/or features, that does not indicate that all of the plurality are essential or required. Various other embodiments within the scope of the described invention(s) include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, a PDA" does not imply that any or all of the three items of that list are mutually exclusive and does not imply that any or all of the three items of that list are comprehensive of any category.

Headings of sections provided in this disclosure are for convenience only, and are not to be taken as limiting the disclosure in any way.

"Determining" something can be performed in a variety of manners and therefore the term "determining" (and like terms) includes calculating, computing, deriving, looking up (e.g., in a table, database or data structure), ascertaining, recognizing, and the like.

A "display" as that term is used herein is an area that conveys information to a viewer. The information may be dynamic, in which case, an LCD, LED, CRT, Digital Light Processing (DLP), rear projection, front projection, or the like may be used to form the display. The aspect ratio of the display may be 4:3, 16:9, or the like. Furthermore, the resolution of the display may be any appropriate resolution such as 480i, 480p, 720p, 1080i, 1080p or the like. The format of information sent to the display may be any appropriate format such as Standard Definition Television (SDTV), Enhanced Definition TV (EDTV), High Definition TV (HDTV), or the like. The information may likewise be static, in which case, painted glass may be used to form the display. Note that static information may be presented on a display capable of displaying dynamic information if desired. Some displays may be interactive and may include touch screen features or associated keypads as is well understood.

The present disclosure may refer to a "control system". A control system, as that term is used herein, may be a computer processor coupled with an operating system, device drivers, and appropriate programs (collectively "software") with instructions to provide the functionality described for the control system. The software is stored in an associated memory device (sometimes referred to as a computer readable medium). While it is contemplated that an appropriately programmed general purpose computer or computing device may be used, it is also contemplated that hard-wired circuitry or custom hardware (e.g., an application specific integrated circuit (ASIC)) may be used in place of, or in combination with, software instructions for implementation of the processes of various embodiments. Thus, embodiments are not limited to any specific combination of hardware and software.

A "processor" means any one or more microprocessors, Central Processing Unit (CPU) devices, computing devices, microcontrollers, digital signal processors, or like devices. Exemplary processors are the INTEL PENTIUM or AMD ATHLON processors.

The term "computer-readable medium" refers to any statutory medium that participates in providing data (e.g., instructions) that may be read by a computer, a processor or a like device. Such a medium may take many forms, including but not limited to non-volatile media, volatile media, and specific statutory types of transmission media. Non-volatile media include, for example, optical or magnetic disks and other persistent memory. Volatile media include DRAM, which typically constitutes the main memory. Statutory types of transmission media include coaxial cables, copper wire and fiber optics, including the wires that comprise a system bus coupled to the processor. Common forms of computer-readable media include, for example, a floppy disk, a flexible disk, hard disk, magnetic tape, any other magnetic medium, a CD-ROM, Digital Video Disc (DVD), any other optical medium, punch cards, paper tape, any other physical medium with patterns of holes, a RAM, a PROM, an EPROM, a FLASH-EEPROM, a USB memory stick, a dongle, any other memory chip or cartridge, a carrier wave, or any other medium from which a computer can read. The terms "computer-readable memory" and/or "tangible media" specifically exclude signals, waves, and wave forms or other intangible or non-transitory media that may nevertheless be readable by a computer.

Various forms of computer readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols. For a more exhaustive list of protocols, the term "network" is defined below and includes many exemplary protocols that are also applicable here.

It will be readily apparent that the various methods and algorithms described herein may be implemented by a control system and/or the instructions of the software may be designed to carry out the processes of the present invention.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models, hierarchical electronic file structures, and/or distributed databases) could be used to store and manipulate the data types described herein. Likewise, object methods or behaviors of a database can be used to implement various processes, such as those described herein. In addition, the databases may, in a known manner, be stored locally or remotely from a device that accesses data in such a database. Furthermore, while unified databases may be contemplated, it is also possible that the databases may be distributed and/or duplicated amongst a variety of devices.

As used herein a "network" is an environment wherein one or more computing devices may communicate with one another. Such devices may communicate directly or indirectly, via a wired or wireless medium such as the Internet, LAN, WAN or Ethernet (or IEEE 802.3), Token Ring, or via any appropriate communications means or combination of communications means. Exemplary protocols include but are not limited to: Bluetooth™, Time Division Multiple Access (TDMA), Code Division Multiple Access (CDMA), Global System for Mobile communications (GSM), Enhanced Data rates for GSM Evolution (EDGE), General Packet Radio Service (GPRS), Wideband CDMA (WCDMA), Advanced Mobile Phone System (AMPS), Digital AMPS (D-AMPS), IEEE 802.11 (WI-FI), IEEE 802.3, SAP, the best of breed (BOB), system to system (S2S), or the like. Note that if video signals or large files are being sent over the network, a broadband network may be used to alleviate delays associated with the transfer of such large files, however, such is not strictly required. Each of the devices is adapted to communicate on such a communication means. Any number and type of machines may be in communication via the network. Where the network is the Internet, communications over the Internet may be through a website maintained by a computer on a remote server or over an online data network including commercial online service providers, bulletin board systems, and the like. In yet other embodiments, the devices may communicate with one another over RF, cable TV, satellite links, and the like. Where appropriate encryption or other security measures such as logins and passwords may be provided to protect proprietary or confidential information.

Communication among computers and devices may be encrypted to insure privacy and prevent fraud in any of a variety of ways well known in the art. Appropriate cryptographic protocols for bolstering system security are described in Schneier, APPLIED CRYPTOGRAPHY, PROTOCOLS, ALGORITHMS, AND SOURCE CODE IN C, John Wiley & Sons, Inc. 2d ed., 1996, which is incorporated by reference in its entirety.

The term "whereby" is used herein only to precede a clause or other set of words that express only the intended result, objective or consequence of something that is previously and explicitly recited. Thus, when the term "whereby" is used in a claim, the clause or other words that the term "whereby" modifies do not establish specific further limitations of the claim or otherwise restricts the meaning or scope of the claim.

It will be readily apparent that the various methods and algorithms described herein may be implemented by, e.g., appropriately programmed general purpose computers and computing devices. Typically a processor (e.g., one or more microprocessors) will receive instructions from a memory or like device, and execute those instructions, thereby performing one or more processes defined by those instructions. Further, programs that implement such methods and algorithms may be stored and transmitted using a variety of media (e.g., computer readable media) in a number of manners. In some embodiments, hard-wired circuitry or custom hardware may be used in place of, or in combination with, software instructions for implementation of the processes of various embodiments. Thus, embodiments are not limited to any specific combination of hardware and software. Accordingly, a description of a process likewise describes at least one apparatus for performing the process, and likewise describes at least one computer-readable medium and/or memory for performing the process. The apparatus that performs the process can include components and devices (e.g., a processor, input and output devices) appropriate to perform the process. A computer-readable medium can store program elements appropriate to perform the method.

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application. Applicants intend to file additional applications to pursue patents for subject matter that has been disclosed and enabled but not claimed in the present application.

The invention claimed is:

1. A method, comprising:

receiving, via a ticket management system controller device in communication with a player device, an indication of a first player associated with a physical lottery ticket, the player device comprising at least one input device configured to receive an identifier from the physical lottery ticket, the ticket management system controller device being programmed in accordance with a software program specifically to provide for management of physical lottery tickets associated with one or more of:

a player-designated beneficiary, and a conditional payout distribution, the ticket management system controller device comprising:

a communications port, at least one input device, at least one output device, a data storage device storing:

the software program, a lottery games database, a lottery ticket database, a lottery player database, and a beneficiary database;

receiving, via the ticket management system controller device, an indication of a second player associated with the physical lottery ticket;

receiving, via the ticket management system controller device, an indication of a beneficiary associated with the physical lottery ticket and an indication of a predetermined threshold payout amount associated with a lottery ticket, wherein if the physical lottery ticket is a winning ticket the beneficiary is to receive at least a portion of any payout amount that is less than or equal to the predetermined threshold payout amount;

determining, via the ticket management system controller device, that the physical lottery ticket is a winning lottery ticket corresponding to a positive payout amount;

determining, via the ticket management system controller device, that the positive payout amount is greater than the predetermined threshold payout amount;

in response to determining that the positive payout amount is greater than the predetermined threshold payout amount, identifying, via the ticket management system controller device, the second player, in which the second player is not the first player; and after identifying the second player, providing, via the ticket management system controller device, at least a portion of the positive payout amount to the second player.

2. The method of claim 1, in which the beneficiary is not provided any portion of the positive payout amount.

3. The method of claim 1, in which receiving the indication of the predetermined threshold payout amount comprises receiving the indication of the predetermined threshold payout amount prior to determining the positive payout amount for the lottery ticket.

4. The method of claim 1, in which receiving the indication of the predetermined threshold payout amount comprises receiving the indication of the predetermined threshold payout amount prior to revealing the positive payout amount for the lottery ticket to any player of the ticket.

5. The method of claim 1, in which receiving the indication of the predetermined threshold payout amount comprises receiving the indication of the predetermined threshold payout amount from one of a group consisting of:

a purchaser of the lottery ticket;

a player of the lottery ticket; and a lottery authority.

6. The method of claim 1, in which receiving an indication of the beneficiary comprises receiving the indication of the beneficiary from the first player.

7. The method of claim 1, in which receiving an indication of the beneficiary comprises receiving the indication of the beneficiary from the second player.

8. The method of claim 1, in which receiving the indication of the beneficiary comprises receiving the indication of a beneficiary from one of a group consisting of:

a purchaser of the lottery ticket; and a lottery authority.

9. The method of claim 1, in which receiving the indication of the beneficiary comprises prompting a user to indicate a beneficiary via a user interface.

* * * * *